(12) United States Patent
Saito

(10) Patent No.: US 7,865,891 B2
(45) Date of Patent: Jan. 4, 2011

(54) INITIATION OF A PROGRAM MODULE CORRESPONDING TO MULTIPLE VERSIONS

(75) Inventor: Masanori Saito, Hokkaido (JP)

(73) Assignee: Seiko Epson Corporation, Tokyo (JP)

( * ) Notice: Subject to any disclaimer, the term of this patent is extended or adjusted under 35 U.S.C. 154(b) by 1290 days.

(21) Appl. No.: 11/389,420

(22) Filed: Mar. 23, 2006

(65) Prior Publication Data
US 2006/0218541 A1 Sep. 28, 2006

(30) Foreign Application Priority Data
Mar. 25, 2005 (JP) ............................. 2005-089606

(51) Int. Cl.
G06F 9/44 (2006.01)
(52) U.S. Cl. ..................... 717/170; 358/1.15
(58) Field of Classification Search ................ 717/170, 717/701; 358/1.15
See application file for complete search history.

(56) References Cited

U.S. PATENT DOCUMENTS

| | | | | |
|---|---|---|---|---|
| 5,228,118 A * | 7/1993 | Sasaki | ........................ | 358/1.13 |
| 5,566,335 A * | 10/1996 | Nash et al. | ....................... | 713/1 |
| 5,603,027 A * | 2/1997 | Ohkami | ....................... | 707/200 |
| 6,658,659 B2 * | 12/2003 | Hiller et al. | .................. | 717/170 |
| 6,704,933 B1 * | 3/2004 | Tanaka et al. | ................ | 725/132 |
| 7,107,330 B1 * | 9/2006 | Hamilton et al. | ............ | 709/221 |
| 7,243,347 B2 * | 7/2007 | Palmer et al. | ................ | 717/170 |
| 7,304,758 B2 * | 12/2007 | Ferlitsch | ..................... | 358/1.15 |
| 7,401,113 B1 * | 7/2008 | Appiah et al. | ................ | 709/203 |
| 7,457,831 B2 * | 11/2008 | Orleth et al. | ................. | 707/203 |
| 7,522,297 B2 * | 4/2009 | Egawa et al. | ................ | 358/1.14 |
| 7,539,985 B2 * | 5/2009 | Marvin | ........................ | 717/170 |
| 2002/0075344 A1 * | 6/2002 | Usui et al. | ..................... | 347/19 |
| 2003/0061604 A1 * | 3/2003 | Elcock et al. | ................ | 717/170 |
| 2004/0093491 A1 * | 5/2004 | Ebata | ........................... | 713/100 |
| 2005/0177826 A1 * | 8/2005 | Miller et al. | ................. | 717/170 |
| 2006/0023230 A1 * | 2/2006 | Nakata | ........................ | 358/1.6 |
| 2006/0107071 A1 * | 5/2006 | Girish et al. | ................. | 713/191 |
| 2006/0152540 A1 * | 7/2006 | Komagamine et al. | ......... | 347/14 |
| 2006/0200817 A1 * | 9/2006 | Callender | .................... | 717/170 |

FOREIGN PATENT DOCUMENTS
JP 2003-256212 9/2003

* cited by examiner

Primary Examiner—Emerson C Puente
Assistant Examiner—Hiren Patel
(74) Attorney, Agent, or Firm—Nutter McClennen & Fish LLP; John J. Penny, Jr.

(57) ABSTRACT

There has been expected to improve the management of version compatibility among multiple program modules that cooperatively implement a specified function. There is provided a method for a program module to perform a process instructed from an application program. To do this, the method acquires an execution instruction for a specified process from the application program. The method selects a program module for performing the process instructed for execution from a plurality of versions of program modules for performing the specified process. The method allows the selected program module to perform the specified process.

4 Claims, 5 Drawing Sheets

FIG. 2

Printer capability data

- Printer name : PM - * * * *
- Driver version : 5.3e
- Ink set : pigment, CMYKlclm
- Specifiable range
    - Target item 1,2, High-order item 1=2, High-order item 2=1,1

⋮

- Target item n,m, High-order item n1=1 ... High-order item ml=3,2,3

INITIATION OF A PROGRAM MODULE CORRESPONDING TO MULTIPLE VERSIONS

The entire disclosure of Japanese Patent Application No. 2005-89606, filed on Mar. 25, 2005, is expressly incorporated by reference herein.

BACKGROUND

1. Field of the Invention

The invention relates to initiation of a program module corresponding to multiple versions.

2. Description of Related Art

An application program used for computers is upgraded when functions are added to the application program or to peripheral devices controlled by the application program. According to a conventional version upgrade, an old version of the program is once uninstalled and then a new version of the program is installed. Alternatively, the old-version program is executed under a new-version program (e.g., patent document 1).

[Patent Document 1]
JP-A No. 256212/2003

The related technology has been expected to improve the management of version compatibility among multiple program modules that cooperatively implement a specified function. That is, a specific application program can be easily upgraded using an installer and the like. However, it has been difficult to maintain the version compatibility when multiple program modules cooperate to necessitate the use of an application program, a peripheral device's driver program, and an intermediate program mediating between both programs.

For example, a peripheral device manufacturer may provide the driver program and the intermediate program. In such case, it is easy to maintain the version compatibility between both. However, there may be a case where the intermediate program mediates between processes of multiple application programs provided by multiple manufacturers. In such case, it is difficult to maintain the version compatibility. That is, it is difficult to request all application program manufacturers to change the application programs in accordance with revision of the driver program and the intermediate program. When a new version of the application program is used, a user needs to upgrade the versions of the driver program and the intermediate program. Otherwise, both are incompatible with each other. In this manner, programs may become unexecutable unless the version compatibility is maintained.

SUMMARY

An advantage of some aspect of the invention is to enable execution of programs independently of versions in a configuration where multiple program modules cooperatively implement a specified function.

When an application program issues an instruction to perform a specified process, one mode of the invention to achieve the above-mentioned advantage selects a program module from multiple versions of program modules to perform the specified process. Even when multiple versions of program modules may be intermingled, it is possible to select and perform a program module capable of performing the specified process. As a result, it is possible to start an appropriate version of program module and reliably perform the specified process.

The application program only needs to issue an instruction to another program module to perform various processes and is not limited to specific purposes and operations. That is, the intermediate processing apparatus according to an aspect of the invention activates another program module in cooperation with the application program. When the application program's version is incompatible with the program module's version, the specified process may not be performed.

For example, let us suppose that the version upgrade adds a new process. To perform this process, the application program issues an instruction to perform the new process. The upgraded program module performs this process. When the old-version application program cannot issue an instruction to perform the new process, the new-version program module cannot perform the new process.

To ensure operations in the newest version, it may be a good practice to delete the old-version program and to make executable the newest-version application program and the newest-version program module. However, only this cannot ensure executability of processes in the previous versions. When multiple versions of program modules are configured to be concurrently usable, the application program version may be incompatible with the program module version. To solve this problem, multiple versions of program modules are configured to coexist. The new and old versions of program modules become concurrently available by selecting the program module capable of performing the above-mentioned specified process instructed for execution.

Let us assume a process that can be implemented only by the old-version program module. That process can be performed only when the new-version program module coexists with the old-version program module. For example, let us suppose that different versions of program modules control various peripheral devices and correspond to the models of these peripheral devices. When only the program module corresponding to the newest model is made executable, it is impossible to use peripheral devices corresponding to old-version program modules. Accordingly, the above-mentioned effect is especially remarkable when multiple versions of program modules are configured to be executable.

While the application program is upgraded as mentioned above, the invention is also effective when the program module is not upgraded. That is, upgrading each program module takes into consideration the creation of a program module capable of performing all old-version processes and new processes. In this case, new and old versions of program modules can perform a common process. When an instruction is issued to perform the common process, the upgraded program module may be requested to be executable. In such case, it is impossible to perform not only a newly added process, but also the common process Even when the program module is not upgraded, the old-version program module can perform the common process. Even when a new-version program module is unavailable, the old-version program module can be selected to perform processes. In this manner, the above-mentioned common process can be performed even when no program module is updated.

When the above-mentioned execution instruction is acquired, it only needs to acquire an instruction to perform any of processes the program module can perform. This instruction is not limited. Various instructions can be used. For example, it is possible to employ a process to acquire options to be displayed for items displayed on the UI so that the application program displays the UI for printing. The invention assumes that the program module independent of the application program performs processes. It is desirable that actual processes in the invention be completed independently of the application program. As an example, the program module cooperates with the other program module (e.g., peripheral device's control program (driver program)) to perform processes.

It only needs to be able to select a program module that performs a process instructed for execution from multiple versions of program modules. Various references can be employed to select program modules. For example, it is possible to accept an execution instruction acquired from the application program and an instruction about a target (e.g., peripheral device) to be processed, and select a program module corresponding to the target to be processed.

In addition, it may be preferable to select the newest one of executable program modules or retrieve to select a program module whose version corresponds to that of an application program. Further, it may be preferable to extract to select a program module capable of performing processes in accordance with the contents of the processes. That is, various techniques can be employed. It only needs to issue an instruction that allows the selected program module to perform processes.

The invention is considered to be applicable to various situations. It is possible to consider an especially preferable situation where there are at least two versions, i.e., a given version of program module and an older version of program module, and any of or a combination of these versions is executable. When there are at least two versions, i.e., new and old ones, and both are executable, an appropriate version can be selected and performed in a situation where at least two versions coexist.

When only the old version is executable, processes can be performed in accordance with execution instructions from the application program corresponding to the old version. Even when an execution instruction is issued from the application program corresponding to the new version, the execution instruction can perform a process common to the new and old versions. When only the new version is executable, processes can be performed in accordance with execution instructions from the application program corresponding to the new version. In this case, no process can be performed correspondingly to an execution instruction from the application program corresponding to the old version. However, an error and the like can be output to notify that no process can be performed.

Preferable examples of the above-mentioned specified process may include issuing a specified inquiry about peripheral devices for the computer and returning a response to the inquiry. When the application program performs processes associated with peripheral devices, the application program may identify processes executable for the peripheral device and select any of the processes. In this case, it is difficult for the application program to identify all the executable processes. In many cases, the application program performs an inquiry to instruct executable processes.

To display a specified UI, for example, the application program performs an inquiry to acquire options to be displayed about items displayed on the UI. Responses to the inquiry may vary with peripheral devices. The application program performs an inquiry via program modules to be able to acquire accurate information about each of the peripheral devices. In many case, the version of the peripheral device corresponds to that of the program module. The program module may be upgraded when the model is changed in accordance with improvement of functions in the peripheral device. Since the invention configures program modules to be selectable, it is possible to perform processes corresponding to various models of peripheral devices.

The peripheral device only needs to be connected to the computer and driven. Various devices can be the peripheral device. One example is output devices such as printers, displays, and projectors that are connected to the computer and output images. Another example is input devices such as scanners and digital cameras that are connected to the computer and input images. Still another example is recording devices such as hard disk drives that are connected to the computer and record data.

In the above-mentioned example, items to be displayed on the UI correspond to processes executable on peripheral devices. Normally, information about the above-mentioned items can be acquired by issuing an inquiry to the control program (driver program) for controlling the peripheral devices or by communicating with the peripheral devices. According to a preferred configuration, the program module issues inquiries to the driver programs and the peripheral devices and acquires responses. Further, the program module returns the responses to the application program.

The application program can directly issue an inquiry to the driver program. However, this configuration needs to always use the consistent format for inquiries about the application program and responses to inquiries. Consequently, upgrading the driver program may necessitate changing the application program.

By contrast, the invention uses the program module to mediate between the application program and the driver program. This makes it possible to always use the same format for inquiries and responses exchanged between the application program and the program module. When the driver program is changed, it only needs to appropriately change the program module. This configuration is preferable when the same manufacturer creates the driver program and the program module and many manufacturers provide application programs.

As another preferred configuration, the program module can perform processes concerning peripheral devices such as specifying peripheral devices for the computer and accepting the above-mentioned execution instruction. Such configuration makes it possible to easily select a program module associated with the peripheral device. When there is one-to-one correspondence between the program module version and the peripheral device, an appropriate program module can be positively selected based on the peripheral device. When the application program performs processes concerning peripheral devices, it is a common practice to specify a process execution instruction and a peripheral device. Accordingly, the above-mentioned configuration can be implemented using only the information about normal processes.

The above-mentioned intermediate processing method may be embodied independently or along with the other methods in the state of being included in a given device. The intermediate processing method includes various modes as ideas of the invention and can be modified appropriately. The invention can be embodied in the intermediate processing apparatus that selects and starts any of multiple versions of program modules. Accordingly, the invention is applicable as an apparatus. The apparatus provides the same operations. In addition, the computer may execute a specified program to embody the invention. Therefore, the invention is also applicable as an intermediate processing program product. Also in this case, the same operations are provided.

Any storage medium is available for providing programs. For example, the storage medium may be a magnetic recording medium or a magnetic optical recording medium. The same concept can be exactly equally applied to any recording media that will be developed in the future. When the invention is embodied partly by software and partly by hardware, the concept of the invention remains completely the same. Part of the program may be stored in a recording medium and may be appropriately read out as needed. The same applies to replica stages such as for primary or secondary replicas.

The technique of the invention can be embodied in an information processing apparatus that performs the application program in cooperation with the above-mentioned intermediate processing apparatus. For example, the information processing apparatus may use another program module to perform specified processes and have an executability determination unit and a specific module activation unit. The executability determination unit determines executability of a process that selects a program module to be executed from multiple versions of program modules. When the process is not determined to be executable, the specific module activation unit determines executability of a specific version of program module and allows the specific version of program module to perform the specified process.

It is possible to employ a configuration that determines executability of a process equivalent to the above-mentioned module selection unit and, when the process is unexecutable, provides an instruction to perform processes of the existing version of program module. An old-version program module may be executable even when the module selection unit according to an aspect of the invention is unexecutable (e.g., a program equivalent to the module selection unit is not installed). Such situation can occur when the application program can directly invoke and execute the old-version program module.

To solve this problem, the executability determination unit determines executability of the module selection unit that selects a program module to be executed from multiple versions of program modules. When the module selection unit is unexecutable, the executability determination unit determines whether or not a specific version of program module is executable. This program module is allowed to perform the above-mentioned specified process. As a result, there may be a case where the module selection unit is unexecutable but the specific version of program module is executable. In this case, the program module can be allowed to perform the specified process.

The above-mentioned information processing apparatus includes various modes as ideas of the invention and can be modified appropriately. That is, an information processing method or an information processing program may embody a procedure to select and start any of multiple versions of program modules on the above-mentioned information processing apparatus. For example, the information processing method is used to perform the above-mentioned procedure by allowing another program module to perform a specified process. The method determines executability of a process that selects a program module to be executed from multiple versions of program modules. When the process is not determined to be executable, the method only needs to determine executability of a specific version of program module and allow the specific version of program module to perform the specified process.

The information processing program product is executed on a computer to perform the above-mentioned procedure by allowing another program module to perform a specified process. The computer only needs to implement an executability determination program code and a specific module activation program code. The executability determination program code determines executability of a process that selects a program module to be executed from multiple versions of program modules. When the process is not determined to be executable, the specific module activation program code determines executability of a specific version of program module and allows the specific version of program module to perform the specified process.

Any storage medium is available for providing program products. For example, the storage medium may be a magnetic recording medium or a magnetic optical recording medium. The same concept can be exactly equally applied to any recording media that will be developed in the future. When the invention is embodied partly by software and partly by hardware, the concept of the invention remains completely the same. Part of the program product may be stored in a recording medium and may be appropriately read out as needed. The same applies to replica stages such as for primary or secondary replicas.

BRIEF DESCRIPTION OF THE DRAWINGS

FIG. 2 shows a description example of printer capability data.

DESCRIPTION OF THE PREFERRED EMBODIMENTS

Figure 1:
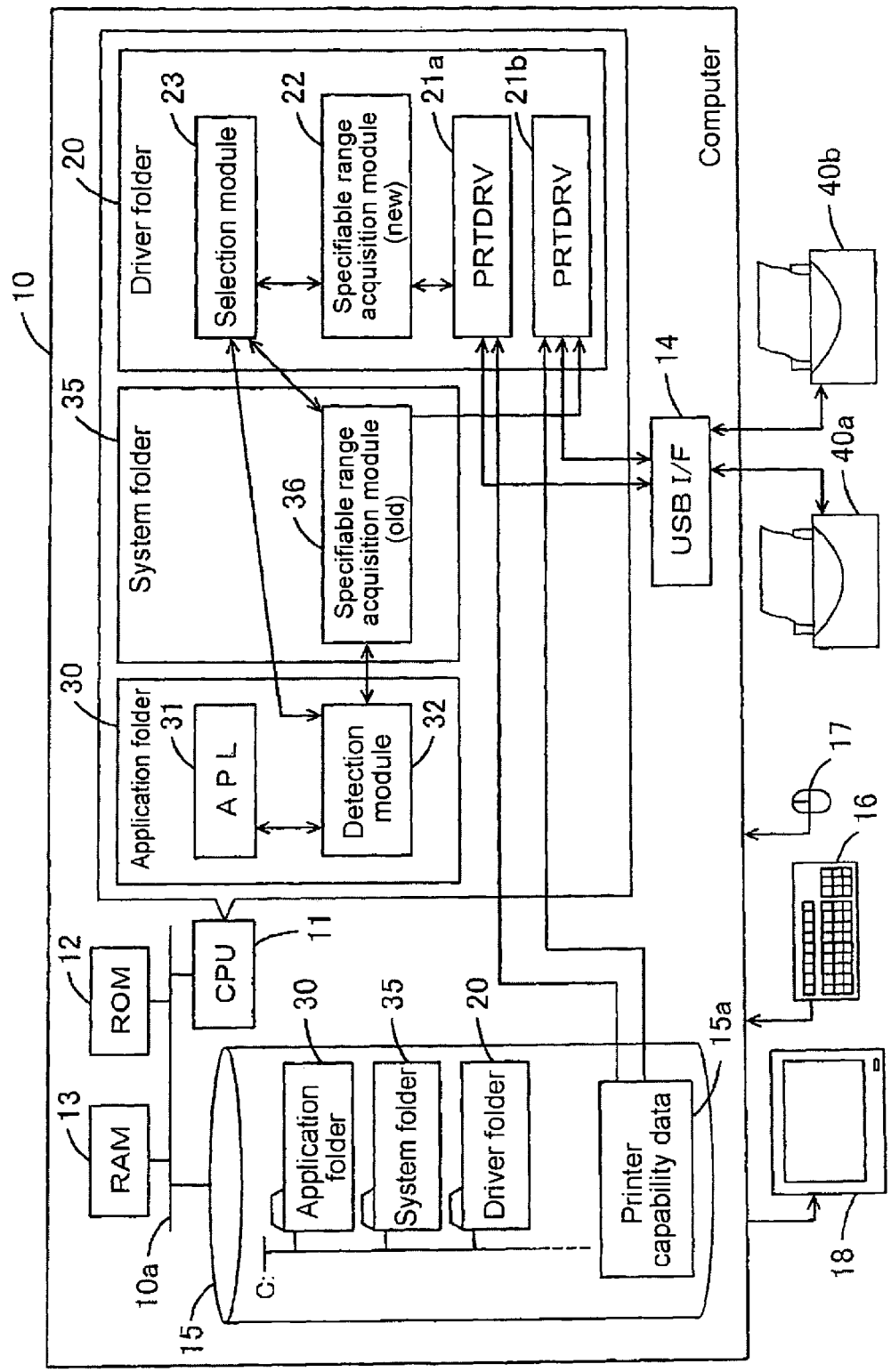
FIG. 1 is a block diagram showing the overall configuration of a print controller.

Embodiments of the invention will be described in the following sequence.
(1) Print controller configuration
(2) Print control process and UI display examples
(2-1) Specifiable range acquisition process
(3) Other embodiments
(1) Print Controller Configuration FIG. 1 shows the overall configuration of the print controller according to an embodiment of the invention. The embodiment uses part of functions of a computer 10 to implement the printer controller. The computer 10 has a CPU 11 as a core of calculation processes. The CPU 11 controls the entire computer 10 via a system bus 10a. The system bus 10a connects with ROM 12, RAM 13, a USB I/F 14, a hard disk drive (HDD) 15, a CRT I/F (not shown), and an input device I/F.

The hard disk drive 15 stores software programs such as an operating system (OS) and the like. Depending on needs, the hard disk drive 15 can store various programs when installed. When these software programs are to be executed, the CPU 11 appropriately transfers them to the RAM 13. The CPU 11 appropriately accesses the RAM 13 as a temporary work area and executes various programs under control of the OS.

The embodiment uses folders in a tree structure to manage programs and data stored in the HDD 15. Programs and data are stored in predetermined folders. According to the example in FIG. 1, an application folder 30 stores programs and data related to an application program (APL 31). A driver folder 20 stores programs and data related to printer drivers (PRTDRVs 21a and 21b). A system folder 35 stores programs and data related the OS.

Locations to store the programs and data only needs to be predetermined, but are not limited. For example, an OS provider may determine the storage location according to a predetermined rule. A program provider may previously determine the storage location. In any case, it only needs to be able to read appropriate programs and data when needed.

The input device I/F connects to a keyboard 16 and a mouse 17 as operation input devices. The CRT I/F connects with a display 18 for monitoring. Accordingly, the computer 10 can accept operational contents by means of the keyboard 16 or the mouse 17 and display various information on the display 18. The USB I/F 14 connects to printers 40a and 40b that can print images based on data output from the computer 10. Of course, the connection I/F for the printers 40a and 40b need not be limited to the USB I/F. Available connection interfaces include various connection modes such as parallel I/F, serial I/F, and SCSI as well as any connection modes to be developed in the future.

The APL 31 is a program to execute various processes. One of the processes is to allow the printers 40a and 40b to print images, documents, and the like used for the APL 31. The embodiment displays a specified UI before instructing print execution and allows a user to perform printing according to instructions on the UI. The UI enables the configuration of various print conditions for the printers 40a and 40b. The UI displays items (print condition items) specifiable as print conditions and allows the print condition to be changed within a specifiable range for each item.

The print condition items provide multiple condition items needed for printing. There are various print condition items specifiable for PRTDRVs 21a and 21b. The various print condition items include: print resolutions, ink types (selection of color or monochrome and ink set (combination of ink colors), print media types and sizes, print layouts, print with or without borders, print quality (fine, fast, and the like), color management types (enabling or disabling the automatic adjustment, the use of colors exceeding the display's color gamut, and the like), enabling or disabling bidirectional printing, and enabling or disabling image processes using the driver. As mentioned above, the embodiment configures print conditions for respective items such as the print resolutions and the ink types. Different print conditions are distinguished from each other as items. A numeric value (setup value) corresponds to the setup content of each print condition and is used to specify the content. This numeric value is referred to as an item value.

A specifiable item value for one print condition item may depend on an item value for another print condition item. In this case, specifying a given item value may change a range of specifiable item values for another print condition item (dependence between item values). The APL 31 acquires the specifiable range while the item values are specified. The APL 31 updates the UI display for the other print condition items whose specifiable range is affected by specification of a given item value. The APL 31 varies the specifiable range on the UI display in accordance with data of the acquired specifiable range.

The APL 31 can inquire specifiable ranges from the other modules to acquire the above-mentioned specifiable range. To perform this process, the application folder 30 stores a detection module 32. The detection module 32 is invoked from the APL 31 and then is executed. The detection module 32 detects whether or not there is a module to respond to an inquiry from the APL 31. While the embodiment configures the APL 31 and the detection module 32 as independent modules, both may be configured as one module.

According to the embodiment, the computer can connect to different types of printers 40a and 40b. The printers 40a and 40b can be controlled by the corresponding PRTDRVs 21a and 21b. The PRTDRVs 21a and 21b can control the printers 40a and 40b and acquire specifiable ranges for the printers. It is only necessary to be able to acquire the specifiable range for each printer. According to the embodiment, printer capability data 15a is previously created when the PRTDRVs 21a and 21b are installed. The PRTDRVs 21a and 21b reference the printer capability data 15a to acquired specifiable ranges.

FIG. 2 shows a data description example of printer capability data 15a. As shown in FIG. 2, the printer capability data 15a contains data representing a printer name, a driver version, an ink set, and a specifiable range. The specifiable range is formatted to sequentially describe data of "target item n, high-order item count m, high-order item n1 and item value, , , high-order item m1 and item value, specifiable range" (where m, n, and 1 are 0 or natural numbers).

The data specifies a specifiable range of target items when a specific value is assigned to the item value that depends on the high order (i.e., the specifiable range may vary with the high-order item value). For example, let us suppose that target item n is the print quality; high-order item is the print media type; and high-order item count m is one. Further, let us suppose that, when item value 1 is assigned to the print media type, item values 2 and 3 are assigned to the print quality. In this case, the printer capability data is described as "print quality, 1, print media type=1, 2, 3." Each item value is previously assigned with the corresponding setup content (e.g., item value 1 for the print quality signifies high quality). Of course, this configuration of printer capability data 15a is only an example. Various configurations can be used on condition that the specifiable range can be acquired.

The printer capability data 15a need not always be created when PRTDRVs 21a and 21b are installed. Without previously creating the printer capability data 15a, PRTDRVs 21a and 21b may inquire it from the printers 40a and 40b when acquiring the specifiable range.

According to the embodiment, a specifiable range acquisition module 22 and a specifiable range acquisition module 36 inquire specifiable ranges. When started, the specifiable range acquisition modules 22 and 36 issue inquiries to PRTDRVs 21a and 21b concerning specifiable ranges of print condition items needed for display on the UI to acquire the specifiable ranges. The acquired specifiable ranges are used for display on the UI.

The specifiable range acquisition modules 22 and 36 correspond to printer models and issue inquiries to PRTDRVs 21a and 21b to control the printers. According to the embodiment, the printer models correspond to the versions of PRTDRVs 21a and 21b and those of the specifiable range acquisition modules. In FIG. 1, the specifiable range acquisition modules 22 and 36 are configured to be executable. This is because the computer 10 uses different models of the printers 40a and 40b.

According to the embodiment, the specifiable range acquisition module 36 corresponds to a version older than that of the specifiable range acquisition module 22, i.e., to an early commercialized printer. Both modules have the same function of acquiring specifiable ranges. There may be a case where upgrading PRTDRV 21b to PRTDRV 21a enables new processes to be performed. In this case, the new-version specifiable range acquisition module 22 can perform a process the specifiable range acquisition module 36 cannot perform. For example, improving printer capabilities may increase specifiable ranges or print condition items. In such case, it is possible to use data that represents the increased print condition contents and item values.

According to the embodiment, the specifiable range acquisition modules 22 and 36 are stored in specified folders when the corresponding PRTDRVs 21a and 21b are installed. When both specifiable range acquisition modules 22 and 36 are executable as shown in FIG. 1, both PRTDRVs 21a and 21b are already installed. Normally, PRTDRVs 21a and 21b are installed using media such as CD-ROM supplied from a manufacturer of the printers 40a and 40b. In addition, it is possible to automatically install PRTDRVs 21a and 21b by means of an OS function. In this case, the specifiable range acquisition modules 22 and 36 may not be installed.

The specifiable range acquisition modules 36 and 22 may inquire specifiable ranges from the different PRTDRVs. PRTDRVs 21a and 21b may perform different processes. According to the embodiment, different specifiable range acquisition modules issue inquiries to different printers. According to the embodiment, PRTDRVs 21a and 21b are downward compatible. A newer version of PRTDRV appropriately returns a specifiable range in response to an inquiry from an older version of the specifiable range acquisition module.

When the PRTDRV version is compatible with the specifiable range acquisition module version, the specifiable range acquisition modules having the compatible versions exchange specifiable ranges with each other. The driver folder stores a selection module 23 to ensure the version compatibility. When a specifiable range is inquired, the selection module 23 selects and executes a specifiable range acquisition module corresponding to the specified printer.

In case of unsuccessful detection of the specifiable range acquisition module corresponding to the specified printer, the selection module 23 searches for an older-version specifiable range acquisition module and starts it when executable. That is, when there is available the specifiable range acquisition module having an appropriate version corresponding to the printer model, that module starts. When the versions are incompatible with each other, the downward compatibility is used to implement at least processes that are implemented on an older version.

The selection module 23 only needs to select a specifiable range acquisition module capable of performing a process whose execution is specified by the APL 31. It may be preferable to select specifiable range acquisition modules based on printer model names. When the downward compatibility is used as mentioned above, however, it is preferable to detect only the newest version of the corresponding specifiable range acquisition module based on printer model names and detect the presence or absence of old modules.

The above-mentioned detection module 32 detects whether or not the above-mentioned selection module 23 is executable. When detecting the selection module 23 to be executable, the detection module 32 starts the selection module 23. When not detecting the selection module 23 to be executable, the detection module 32 detects whether or not the specifiable range acquisition module 36 is executable. When the selection module 23 is unexecutable, this signifies that the newest version of the specifiable range acquisition module 22 is unavailable. The detection module 32 searches for an older version of the specifiable range acquisition module 36 and starts it when available.

Even when the specifiable range acquisition module 22 is not installed, the configuration implements at least processes implemented for the old versions. In order to determine whether or not the modules are executable, it is possible to employ various configurations such as determining whether or not a predetermined folder stores a predetermined program module.

(2) Print Control Process and UI Display Examples

Figure 3:
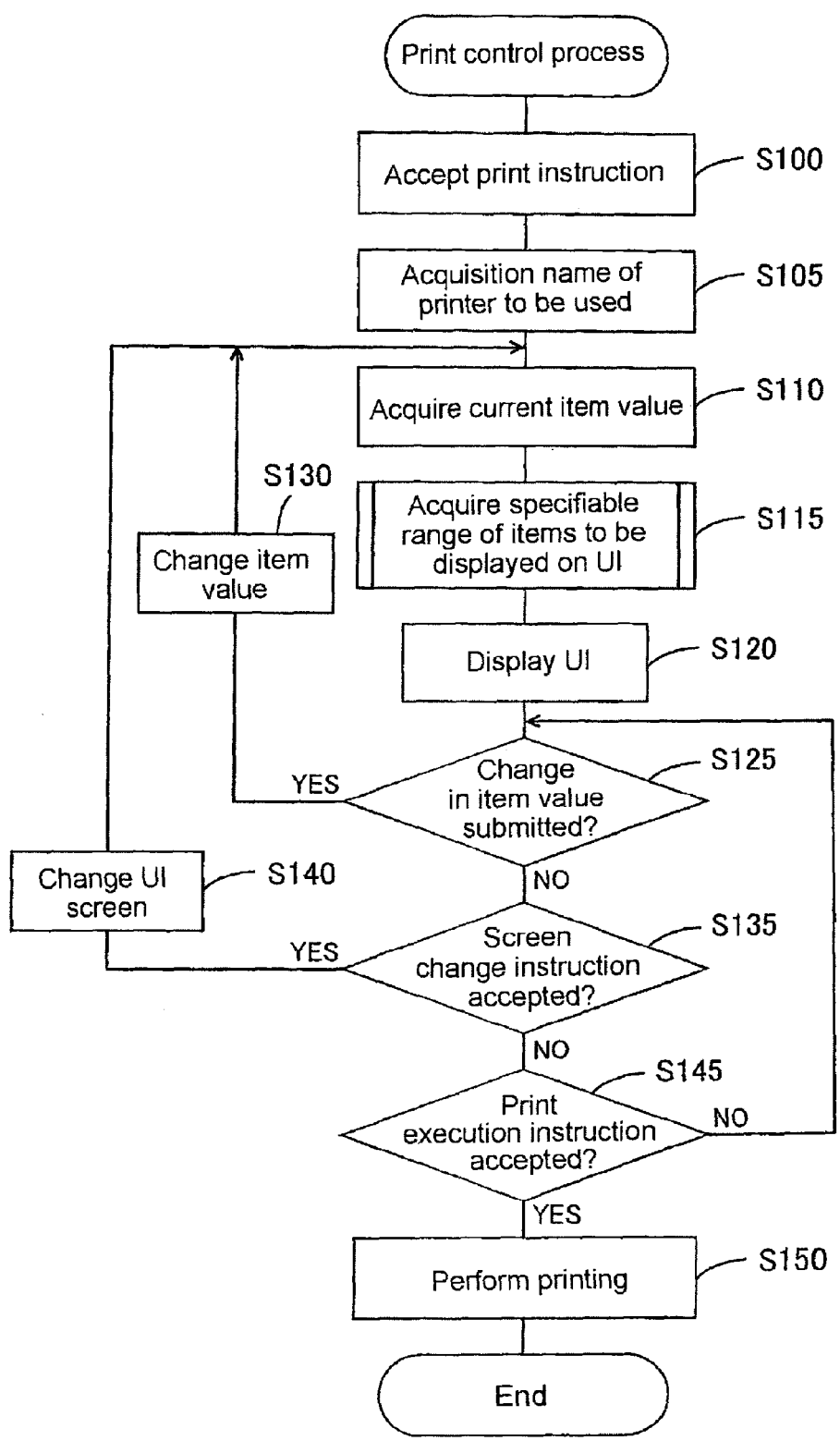
FIG. 3 is a flowchart showing a print control process.
Figure 4:
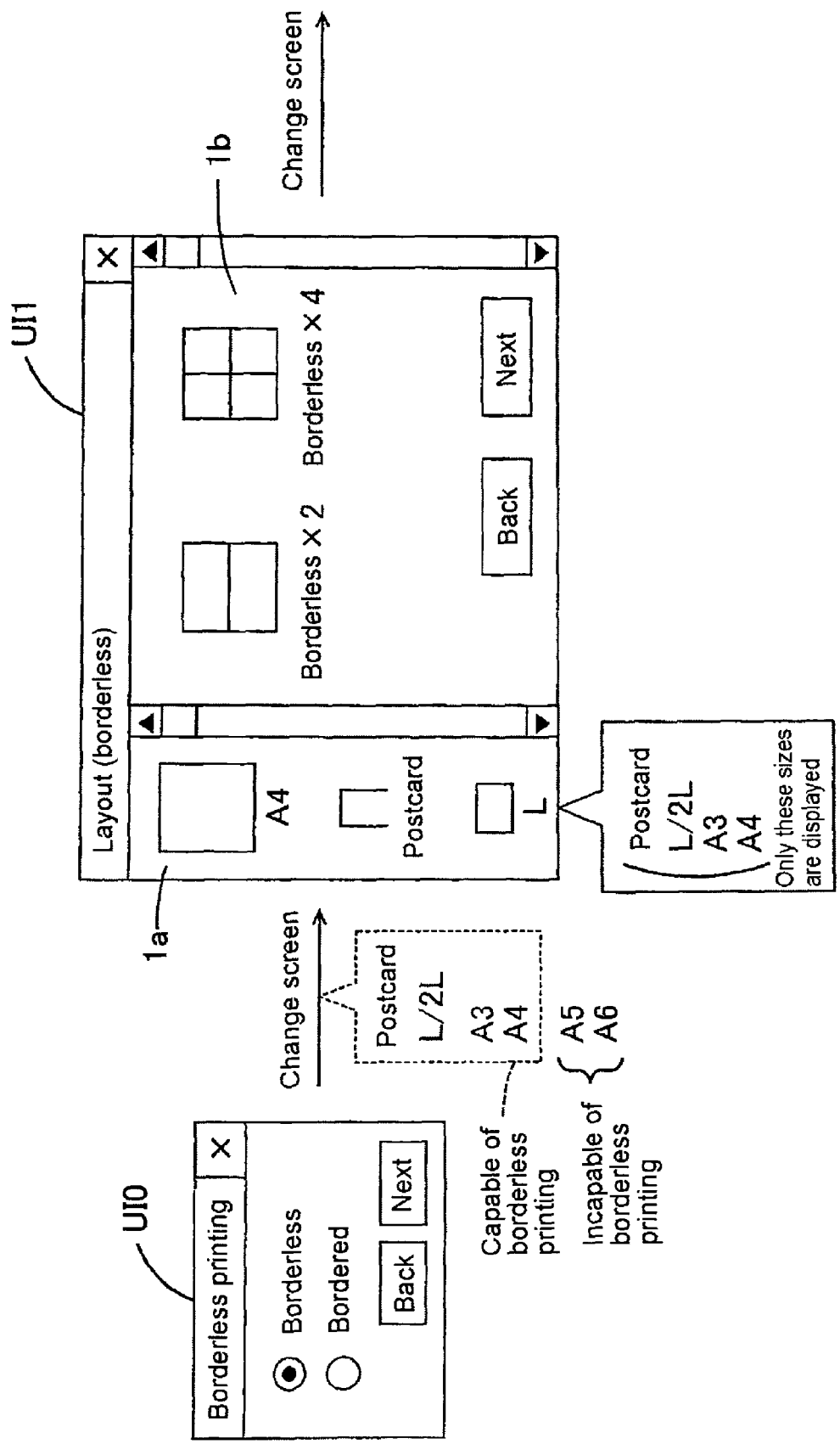
FIG. 4 shows a display example of UI.

The following describes a print control process and a UI display example in the above-mentioned configuration. The print control process is performed in accordance with a flow in FIG. 3. FIG. 4 exemplifies the UI displayed accordingly. A user can enter an instruction to print images and documents processed by the APL 31. When receiving a print instruction (Step S100), the APL 31 displays a UI (not shown). The APL 31 acquires the name of a printer used for printing specified by the instruction (Step S105). The APL 31 only needs to acquire a printer model name specified as the printer normally used by an OS 20. When the user specifies a specific printer in the print instruction, the APL 31 acquires the corresponding model name.

The APL 31 acquires a present item value (current item value) for each print condition item (Step S110). The current item value is specified for each print condition item during execution of a loop between Steps S110 through S130. At the first loop, the current item value to be acquired corresponds to the item value of the print condition item during the most recent print execution or to a default item value. At the second or later loop, the current item value corresponds to an item value that is appropriately changed by UI operations.

After acquiring the current item value, the APL 31 acquires a specifiable range of UI display target items (Step S115). That is, the APL 31 determines whether or not high-order items are provided for all print condition items to be displayed on the UI. When the high-order items are available, the APL 31 assigns current item values to the high-order items. With the item values assigned to the high-order items, the APL 31 acquires a specifiable range of print condition items to be displayed on the UI. The description to follow will focus on a process to select the module that acquires the specifiable range.

When acquiring the specifiable range of UI display target items, the APL 31 identifies the acquired specifiable range as a selectable option. The APL 31 displays the UI assigned with the current item values (Step S120). When the UI is displayed, the APL 31 determines whether or not the mouse 17 or the like is operated to submit a change in the item value (Step S125). When it is determined that the change in the item value is submitted, the APL 31 changes the item's item value (Step S130) and repeats the process at Step S110 and later.

In this repetitive process, the process at Steps S110 and S115 acquires an appropriate specifiable range even when changing an item value at Step S130 varies the specifiable range of print condition items to be displayed on the UI. The UI can be updated without displaying an unselectable print condition item as if it were selectable in the UI display process at Step S120.

The UI according to the embodiment prompts a user to select only part of all print condition items on one screen. The user enters a limited number of print condition items on the one screen and sequentially proceeds to the other screens to finally submit the print execution instruction. At Step S135, the APL 31 determines whether or not a screen change instruction is accepted. When it is determined that the screen change instruction is accepted, the APL 31 changes the UI screen (Step S140). The APL 31 repeats the process at Step S110 and later to appropriately display the print condition items to be displayed on the UI after the screen change.

When it is not determined at Step S135 that the screen change instruction is accepted, the APL 31 further determines whether or not the print execution instruction is accepted (Step S145). When it is determined that the print execution instruction is accepted, the APL 31 outputs image data to be printed to the PRTDRV 21a or the PRTDRV 21b (Step S150). At this time, the print process uses the item values assigned to the print condition items on the UI. As a result, the PRTDRV 21a or 21b processes the image data according to the print condition, creates print data for printing according to the print condition, and outputs the print data to the printer 40a or 40b to perform printing.

FIG. 4 shows transition of the UI screens according to the embodiment. The UI according to the embodiment prompts a user to select only part of all print condition items on one screen. The user enters a limited number of print condition items on the one screen and sequentially proceeds to the other screens to finally submit the print execution instruction. According to the example in FIG. 4, a UI 1 is used to select print media layouts. The UI 1 displays a frame 1a to the left for selecting print media sizes as print condition items and displays a frame 1b to the right for selecting layouts as print condition items. A UI 0 in FIG. 4 determines whether or not to enable borderless printing (printing without providing blanks on four sides of a medium).

On each UI, clicking on a radio button or an icon enables each print condition item. Pressing a "Back" button on the bottom right of the screen displays the most recent UI screen. Pressing a "Next" button proceeds to the next UI screen. The last UI allows a print execution instruction button to be used to execute the print execution instruction. In this example, the layout defines the image arrangement on the print media. The print media size is a high-order item for the layout. The printers 40a and 40b limit print media sizes capable of borderless printing. In this respect, the availability of borderless printing is a high-order item for the print media. According to the example in FIG. 4, the printers 40a and 40b are capable of printing using the print media sizes such as postcard, L, 2L, and A3 through A6. The borderless printing is available for the print media sizes such as postcard, L, 2L, A3, and A4.

The UI 0 displays the bordered printing and the borderless printing as specifiable ranges. When the user selects the borderless printing as an item value and proceeds to the next UI 1, the frame 1a displays the postcard, L, 2L, A3, and A4 sizes as the selectable range. When the user selects the bordered printing as an item value and proceeds to the next UI 1, the frame 1a displays the postcard, L, 2L, A3, and A3 through A6 sizes as the selectable range. When the user selects a print media size in the frame 1a of the UI 1, the frame 1b automatically updates the layouts. The frame 1b provides the specifiable range of only layouts that are printable for the currently selected print media size.

In this manner, an author of the APL 31 can configure the UI according to the embodiment simply by selecting an intended print condition item and defining it as a target to be displayed on the UI. When the APL 31 is designed to inquire the specifiable range of intended print condition items, the specifiable range acquisition module 22 or the specifiable range acquisition module 36 returns a response. The author of the APL 31 can very easily configure the UI. When a version upgrade will be released, the selection module 23 selects an appropriate specifiable range acquisition module. It is possible to avoid a situation where the APL 31 invokes an inappropriate version of the module to unsuccessfully perform the process. Of course, the UI configuration in FIG. 4 is an example. Available UI configurations may display many print condition items on one screen or gray out an unselectable item value.

(2-1) Specifiable Range Acquisition Process

Figure 5:
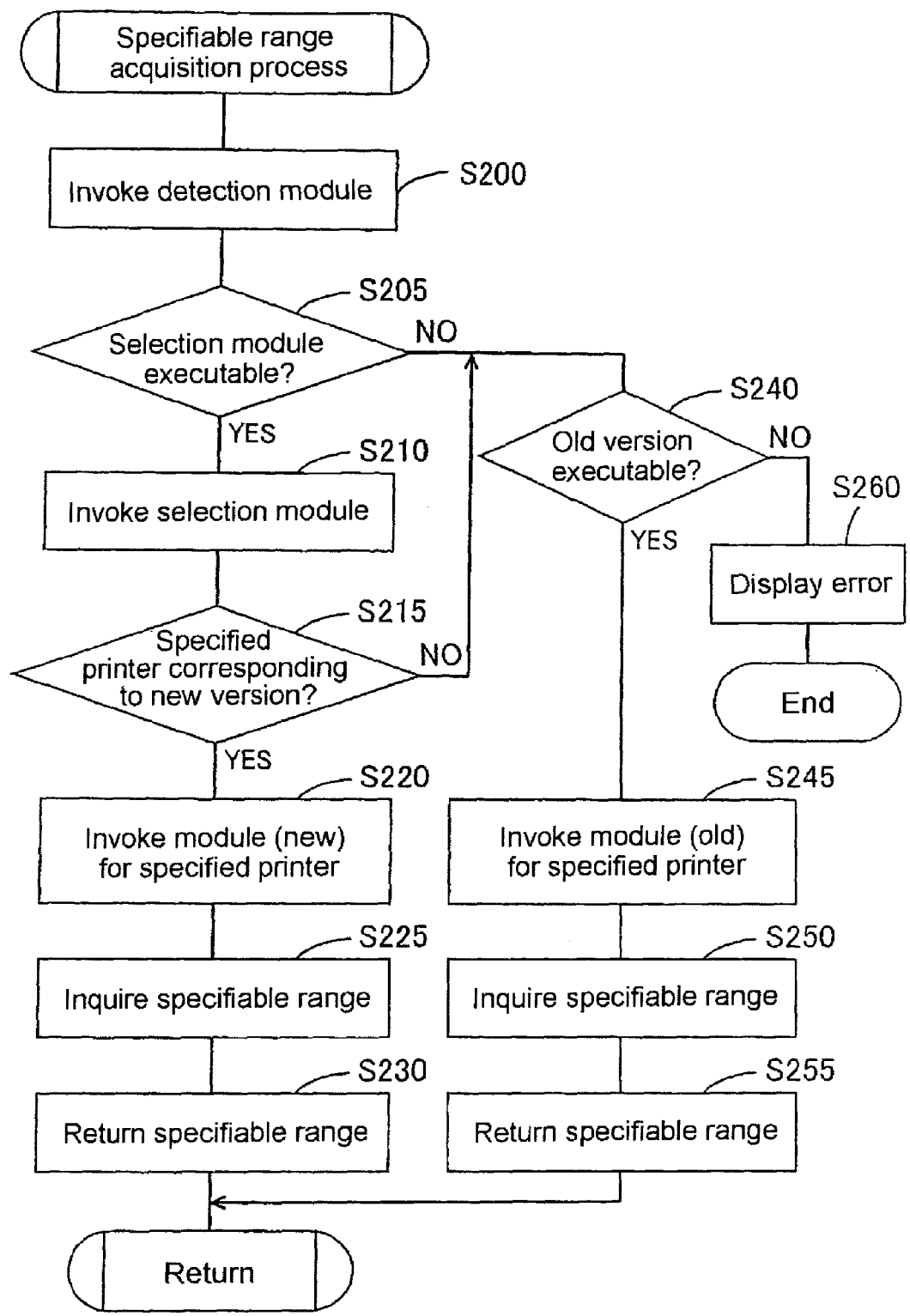
FIG. 5 is a flowchart showing a specifiable range acquisition process.

FIG. 5 is a flowchart showing the specifiable range acquisition process at Step S115 mentioned above. The following describes the specifiable range acquisition process with reference to this flowchart. In the specifiable range acquisition process, the APL 31 first invokes and executes the detection module 32 (Step S200). When executed, the detection module 32 determines whether or not the driver folder 20 stores the selection module 23 so as to be executable (Step S205).

When it is determined at Step S205 that the selection module 23 is executable, it is invoked and executed (Step S210). When executed, the selection module 23 determines based on the printer name acquired at Step S105 above whether or not the printer having the printer name corresponds to a new version of the specifiable range acquisition module 22 (Step S215). Since the specifiable range acquisition module corresponds to a predetermined printer, the selection module 23 determines whether or not there is a new version of the specifiable range acquisition module corresponding to the printer specified at the time of printing.

When it is determined at Step S215 that the specified printer corresponds to the new version of the specifiable range acquisition module 22, the specifiable range acquisition module 22 is invoked and executed (Step S220). The selection module 23 detects that the process to be executed by the APL 31 is going to perform a process to acquire the specifiable range of print condition items to be displayed on the UI. The selection module 23 invokes the specifiable range acquisition module to acquire the specifiable range. According to the embodiment, the selection module 23 keeps tracks of the specified process. This facility is equivalent to an execution instruction acquisition unit in the appended claims. An execution instruction acquired from the APL 31 is not limited to the specifiable range acquisition process. It is possible to acquire execution instructions for the other processes from the APL 31. In this case, it may be necessary to start a program module to perform the other processes.

When the specifiable range acquisition module 22 is executed at Step S220, it inquires the specifiable range of target items to be displayed on the UI from the PRTDRV 21a that controls the specified printer (Step S225). As a result, the PRTDRV 21a references the printer capability data 15a, acquire the specifiable range, and passes it to the specifiable range acquisition module 22. In response to this, the specifiable range acquisition module 22 passes data indicative of this specifiable range to the APL 31 (Step S230). The abovementioned process acquires the specifiable range about print conditions corresponding to the display target items for the APL 31 to appropriately display the UI.

When the selection module 23 is not determined to be executable at Step S205, the detection module 32 determines whether or not an old version of the specifiable range acquisition module is executable. When the printer is not determined to correspond to the new version of the specifiable range acquisition module 22 at Step S215, the selection module 23 determines whether or not an old version of the specifiable range acquisition module is executable (Step S240). No specifiable range can be acquired when the old version of the specifiable range acquisition module is not determined to be executable at Step S240. The selection module 23 displays an error on the UI (Step S260) and terminates the process. In this case, various errors can be displayed. It may be preferable to display a message prompting the user to install an appropriate printer driver.

When the old version of the specifiable range acquisition module is determined to be executable at Step S240, it is invoked and executed (Step S245). According to the embodiment, the old version of the specifiable range acquisition module corresponds to the specifiable range acquisition module 36. The process at Step S215 and S240 is equivalent to that of a module selection unit in the claims. The process at Step S220 and S245 is equivalent to that of an execution control unit in the claims.

When the specifiable range acquisition module 36 is executed, it inquires the specifiable range of target items displayed on the UI from the PRTDRV 21b that controls the specified printer (Step S250). As a result, the PRTDRV 21b references the printer capability data 15a, acquires the specifiable range, and passes it to the specifiable range acquisition module 36. In response to this, the specifiable range acquisition module 36 passes data indicative of this specifiable range to the APL 31 (Step S255). The above-mentioned process acquires the specifiable range about print conditions corresponding to the display target items for the APL 31 to appropriately display the UI.

The selection module 23 and the specifiable range acquisition module 22 are installed simultaneously. When the selection module 23 is not determined to be executable at Step S205 in the above-mentioned process, this signifies that a new version of the specifiable range acquisition module 22 is not installed. Even in this case, drivers for various printers may be installed. In many cases, for example, PRTDRV may be able to install an OS-supplied function.

In this case, the specifiable range acquisition module 22 corresponding to the new version is unexecutable. However, the printer corresponding to the new version of PRTDRV is capable of printing. When the selection module 23 is determined to be executable at Step S205, an old version of the specifiable range acquisition module 36 may be retrieved and executed. It is possible to ensure at least processes executable on the specifiable range acquisition module 36. According to the embodiment, the PRTDRVs 21a and 21b have the downward compatibility. Even when any of the printers 40a and 40b is specified at Step S105, the specifiable range acquisition module 36 can acquire the specifiable range.

When the printer is not determined to correspond to the new version of the specifiable range acquisition module 22 at Step S215, the selection module 23 is executable. However, the specified printer may not correspond to the new version of the specifiable range acquisition module 22. Accordingly, an old version of the specifiable range acquisition module 36 is retrieved and executed. This process can ensure the simultaneous use of the printer 40b corresponding to the old version of the specifiable range acquisition module 36 and the printer 40a corresponding to the new version of the specifiable range acquisition module 22. In addition, it is possible to make the versions compatible with each other.

According to the above-mentioned configuration, the APL 31 is provided with the detection module 32. The detection module 32 determines whether or not the selection module 23 is executable. Accordingly, the APL 31 is equivalent to an application program corresponding to the versions of the selection module 23 and the specifiable range acquisition module 22. As mentioned above, the determinations at Steps S205 and S215 are provided so that the old version of the specifiable range acquisition module 36 is executable. Let us consider a case where the APL 31 is preinstalled in the computer 10 and a user is responsible for determining whether or not to install the specifiable range 36. In such case, the APL 31 can provide minimal processes when displaying the UI.

Further, according to the embodiment, an old-version APL can execute the specifiable range acquisition module 36 without executing a process equivalent to the detection module 32. The old-version APL only needs to be configured to directly invoke the specifiable range acquisition module 36 without invoking the selection module 23. Even when the PRTDRVs 21a and 21b corresponding to the printers 40a and 40b are already installed and the old-version APL is executed, the appropriate specifiable range acquisition module 36 can be invoked and executed.

(3) Other Embodiments

According to an aspect of the invention, the module selection unit only needs to be able to select an appropriate module to invoke a module corresponding to an execution instruction from the application program. In addition to the above-mentioned embodiment, various configurations can be employed. For example, the above-mentioned example does not limit the locations to store the specifiable range acquisition module and the selection module as mentioned above. The system folder may store a module whose process is similar to the selection module 23.

There has been described the embodiment that provides the PRTDRVs 21a and 21b with downward compatibility to enable both PRTDRVs to exchange data with the specifiable range acquisition module 36. There may be many combinations of installation situations and executable versions with respect to the PRTDRV, the specifiable range acquisition module, the selection module, and the APL. In order to perform appropriate processes for respective cases, it may be preferable to provide multiple executable modules that function approximately identically to the specifiable range acquisition module 36.

The invention can be applied to peripheral devices other than printers. That is, the invention can be applied to all peripheral devices that can use the UI to configure operational conditions. While the above-mentioned embodiment uses the computer 10 for the print controller, various configurations can be employed such as distributed processing to implement the print control process according to an aspect of the invention. Of course, it may be preferable to perform the print control process according to an aspect of the invention on a complex machine that combines a scanner to scan images with a printer to print images.

While the invention has been particularly shown and described with respect to preferred embodiments thereof, it should be understood by those skilled in the art that the foregoing and other changes in form and detail may be made therein without departing from the spirit and scope of the invention as defined in the appended claims.

We claim:

1. An intermediate processing method which allows a program module to perform a specified process instructed from an application program, comprising the steps of:
    acquiring an execution instruction for the specified process from the application program;
    determining whether or not a selection module is stored in a predetermined folder, the selection module being adapted to select a program module for performing the specified process from a plurality of versions of program modules;
    when it is determined that the selection module is stored in the predetermined folder, allowing the selection module to select a program module for performing the specified process from a plurality of versions of program modules including at least two versions, including a given version of program module and a newer version of program module;
    allowing the selected program module to perform the specified process; wherein when it is determined that the selection module is not stored in the predetermined folder, allowing the given version of program module to perform the specified process; and
    the specified process issues an inquiry to a printer driver concerning specifiable ranges of print condition items to be displayed on a user interface screen to acquire the specifiable ranges and passes the acquired specifiable ranges to the application program.

2. The intermediate processing method according to claim 1, wherein the acquiring step acquires specification for a printer and the execution instruction; and the allowing step allows the selection module to select a program module associated with a specified printer.

3. An intermediate processing apparatus which allows a program module to perform a specified process instructed from an application program, comprising:

an execution instruction acquisition unit that acquires an execution instruction for the specified process from the application program;

a determination unit that determines whether or not a selection module is stored in a predetermined folder, the selection module being adapted to select a program module for performing the specified process from a plurality of versions of program modules;

a module selection unit that allows the selection module to select, when it is determined that the selection module is stored in the predetermined folder, a program module for performing the specified process from a plurality of versions of program modules including at least two versions, including a given version of program module and a newer version of program module;

an execution control unit that allows the selected program module to perform the specified process; wherein when it is determined that the selection module is not stored in the predetermined folder, allowing the given version of program module to perform the specified process; and the specified process issues an inquiry to a printer driver concerning specifiable ranges of print condition items to be displayed on a user interface screen to acquire the specifiable ranges and passes the acquired specifiable ranges to the application program.

4. An intermediate processing program product which allows a program module to perform a specified process instructed from an application program and allows a computer to implement:

an execution instruction acquisition program code that acquires an execution instruction for the specified process from the application program;

a determination program code that determines whether or not a selection module is stored in a predetermined folder, the selection module being adapted to select a program module for performing the specified process from a plurality of versions of program modules;

a module selection program code that allows the selection module to select, when it is determined that the selection module is stored in the predetermined folder, a program module for performing the specified process from a plurality of versions of program modules including at least two versions, including a given version of program module and a newer version of program module;

an execution control program code that allows the selected program module to perform the specified process; wherein when it is determined that the selection module is not stored in the predetermined folder, allowing the given version of program module to perform the specified process; and the specified process issues an inquiry to a printer driver concerning specifiable ranges of print condition items to be displayed on a user interface screen to acquire the specifiable ranges and passes the acquired specifiable ranges to the application program.

* * * * *